(12) United States Patent
Cain

(10) Patent No.: US 7,021,938 B2
(45) Date of Patent: Apr. 4, 2006

(54) EDUCATIONAL KIT FOR TEACHING CONSTRUCTION FRAMING

(76) Inventor: John S. Cain, 24 Schoolhouse Rd., Narragansett, RI (US) 02882

( * ) Notice: Subject to any disclaimer, the term of this patent is extended or adjusted under 35 U.S.C. 154(b) by 0 days.

(21) Appl. No.: 10/894,602

(22) Filed: Jul. 20, 2004

(65) Prior Publication Data
US 2006/0019221 A1    Jan. 26, 2006

(51) Int. Cl.
G09B 25/04    (2006.01)
(52) U.S. Cl. .................... 434/72; 434/79; 446/110
(58) Field of Classification Search .......... 434/72–80; 446/110; 227/147
See application file for complete search history.

(56) References Cited

U.S. PATENT DOCUMENTS

| 1,024,645 | A | * | 4/1912 | Morrison | 227/116 |
| 1,830,382 | A | * | 11/1931 | Bemis | 52/585.1 |
| 1,955,194 | A | * | 4/1934 | Leake | 446/104 |
| 2,217,374 | A | * | 10/1940 | Menzel | 446/75 |
| 2,441,761 | A | * | 5/1948 | Guelicher | 446/110 |
| 2,523,508 | A | * | 9/1950 | Ledgett | 434/72 |
| 2,871,619 | A | * | 2/1959 | Walters | 446/110 |
| 3,646,690 | A | * | 3/1972 | Feagan | 434/73 |
| 3,998,002 | A | * | 12/1976 | Nathanson | 446/115 |
| 4,527,981 | A | * | 7/1985 | Chisum | 434/72 |
| 4,817,356 | A | * | 4/1989 | Scott | 52/733.2 |
| 5,165,588 | A | * | 11/1992 | Rowland | 227/147 |
| 5,718,089 | A | * | 2/1998 | Dakin | 52/204.1 |

FOREIGN PATENT DOCUMENTS

DE    3215953 A1    11/1983

* cited by examiner

Primary Examiner—Dmitry Suhol
(74) Attorney, Agent, or Firm—Barlow, Josephs & Holmes, Ltd.

(57) ABSTRACT

An instructional kit suited for teaching the necessary materials, methods and techniques for conventional stick built wood structures is provided. In accordance with the present invention, a kit for stick framing a true representation of a scale house model includes all of the framing members required to build a scale model house. Specifically, the kit includes precut framing members representing each of the correct members used in actual residential construction such as studs, rafters, sills, top plates, headers, etc. Also included in the kit are wall layout plans and detailed instructions regarding the proper construction of a residential house. The intent of the kit is to provide a self contained educational tool for teaching the necessary understanding of structural wood framing.

7 Claims, 4 Drawing Sheets

EDUCATIONAL KIT FOR TEACHING CONSTRUCTION FRAMING

BACKGROUND OF THE INVENTION

The present invention relates generally to an educational kit for teaching construction framing. More specifically, the present invention relates to a scale model of a residential, conventionally framed structure provided in a kit, the purpose of which is to teach the proper techniques, methods and structural relationships utilized in modern wood frame construction.

Wooden frame construction has been the primary means of construction utilized in building residential structures since at least as early as colonial times. The reason that wood framing was widely adopted as the preferred method for framing a structure was that the necessary raw material was plentiful and could be easily shaped and joined to as needed to form a structure suitable for a residential dwelling. The earliest form of wood frame structures were typically constructed from large rough hewn wooden members that were joined by creating mortise and tennon joints. This method is referred to as post and beam construction. In a post and beam structure, the structural members were formed into large frame structures that included numerous vertical supporting columns and horizontal beam members extending between each of the columns. Once the frame was constructed the open areas within the frames were infilled utilizing various techniques including stucco, straw thatch and plank siding.

A similar technique that was utilized during this particular era was the traditional log home. Log homes were formed by stacking repetitive layers of interlocked logs on top of one another by cutting simple saddle joints into the ends of the logs and staking the logs in an alternating pattern along the side walls and then along the front and back walls. The gaps between the logs were then packed with a suitable material in order to stop the penetration of the elements.

Both the post and beam and stacked log methods for framing remained widely popular because the rudimentary nature of the tools utilized in construction at the time limited the ability of the carpenter to easily and quickly change the overall profile of the rough log. In the interest of expediency, these techniques allowed the carpenter to utilize rough logs to easily and quickly construct a wood structure.

As was the case with most trades, the skills necessary to properly construct a structure were passed down along generational lines. Fathers and grandfathers would teach the children how to properly utilize wood working tools and more importantly the proper techniques and methods that were necessary to construct a dwelling structure.

Over time, through the industrialization of the country, the tools available for shaping wood structural members became more sophisticated. The formation of wooden dwelling structures evolved quickly as the ability to easily modularize and standardize wood framing methods became common place. The wood materials that were previously were limited in use to only rough formed members were being formed into standardized dimensional lumber pieces. Logs were being cut into structural framing members having standard dimensions such as 2×4's and the like. As dimensional lumber became more commonplace, the techniques for creating wooden structures changed and evolved to utilize the newly available framing materials. Specifically, the walls themselves became unitary structures that serve as the bearing members for the structure. Rather than framing the structure with post and beam frames, the entire wall structure was formed from periodic spaced framing members that were joined at their tops by a beam or top plate allowing all of the wall framing members to work together to provide the necessary structural support. Wood structures were typically framed utilizing a series of vertical framing members that extended from the foundation all the way to the roof line with the intermediate floor structures supported within the walls by hanging them from the wall structures. This technique for framing a structure was referred to as balloon framing.

As framing methods further evolved, other methods of assembling the necessary dimensional lumber members emerged. Conventional framing in today's residential construction industry is typically a newer variation of balloon framing that is referred to as platform framing, where a floor structure is created upon which a single story wall is erected and a second floor structure is then erected on the top of the wall structure. In this manner, the wall structure is interrupted at each floor level by a floor structure and the floor is supported by a wall that is placed directly beneath it. This method of framing has become the preferred framing method and is widely used throughout the industry. Generally, the methods of innovation in the construction industry today are simply variations of materials and installation methods for constructing a platform style stick framed structure.

Additionally, while the materials and methods for creating a wood framed structure have typically changed over time, the manner in which the necessary skills for framing a wood structure are transferred to newer generations of carpenters has not. Generally, carpenters today learn the methods and techniques for framing a wood frame structure by working with someone who has experience in this type of construction. In this manner, the carpenter receives on the job training by building using his own hands to construct the structure while being supervised and directed by a more experienced carpenter. However, when learning to construct a structure in this manner, the carpenter also tends to learn the particular quirks or terminology that the older carpenter may utilize. The drawback is that these terms and techniques may not be universal or standard in the industry. Further, as since modern materials and techniques are changing much more quickly, it may not be proper for a new carpenter to adopt the older and possibly outdated techniques utilized by an older carpenter. Finally, since fewer and fewer people are going into the carpentry trade, the pool for skilled carpenters has been greatly reduced therefore also providing fewer experienced carpenters to pass along the necessary knowledge for creating wood framed structures.

There is therefore a need for a means and method for teaching the techniques and technology necessary for constructing a wood framed structure. Further there is a need for a teaching device whereby an carpenter can learn the proper materials, techniques and methods utilized in constructing a conventional wood framed structure while ensuring that the methods and techniques that are conveyed utilize correct terminology, incorporate any modernized methods and materials and provide a standardized knowledge base upon which a the new carpenter can build.

BRIEF SUMMARY OF THE INVENTION

In this regard, the present invention provides an instructional kit suited for teaching the necessary materials, methods and techniques for conventional stick built wood structures. In accordance with the present invention, a kit for stick framing a true representation of a scale house model is provided. The kit includes all of the framing members required to build a scale model house. Specifically, the kit includes precut framing members representing each of the correct members used in actual residential construction such as studs, rafters, sills, top plates, headers, etc. Also included in the kit are wall layout plans and detailed instructions regarding the proper construction of a residential house.

In general, the intent of the kit is to provide a self contained educational tool for teaching the necessary understanding of structural wood framing. The advantage of the present invention is that by standardizing the instructional method, the user is able to learn the proper terminology and techniques while constructing the true to life wooden frame. Further, the kit can be periodically revised or updated to include newer materials and methods thereby providing an evolving and interactive instructional tool for assisting newer carpenters in learning the trade. Further, it should be appreciated that the kit may also be of interest to other people who are not carpenters but are simply curious relative to the technologies utilized in building a modern house.

Accordingly, it is an object of the present invention to provide a novel educational tool for teaching the proper means and methods of constructing a conventionally framed wood structure. It is a further object of the present invention to provide an educational tool that consists of a scale model kit that includes all of the necessary framing elements, plans and instructions to educate a user of the proper means and methods necessary to construct a conventionally framed residential structure. It is yet a further object of the present invention to provide a kit that includes all of the necessary framing members, instructions and plans necessary for a user to build scale model of a conventionally framed wood structure.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 1:
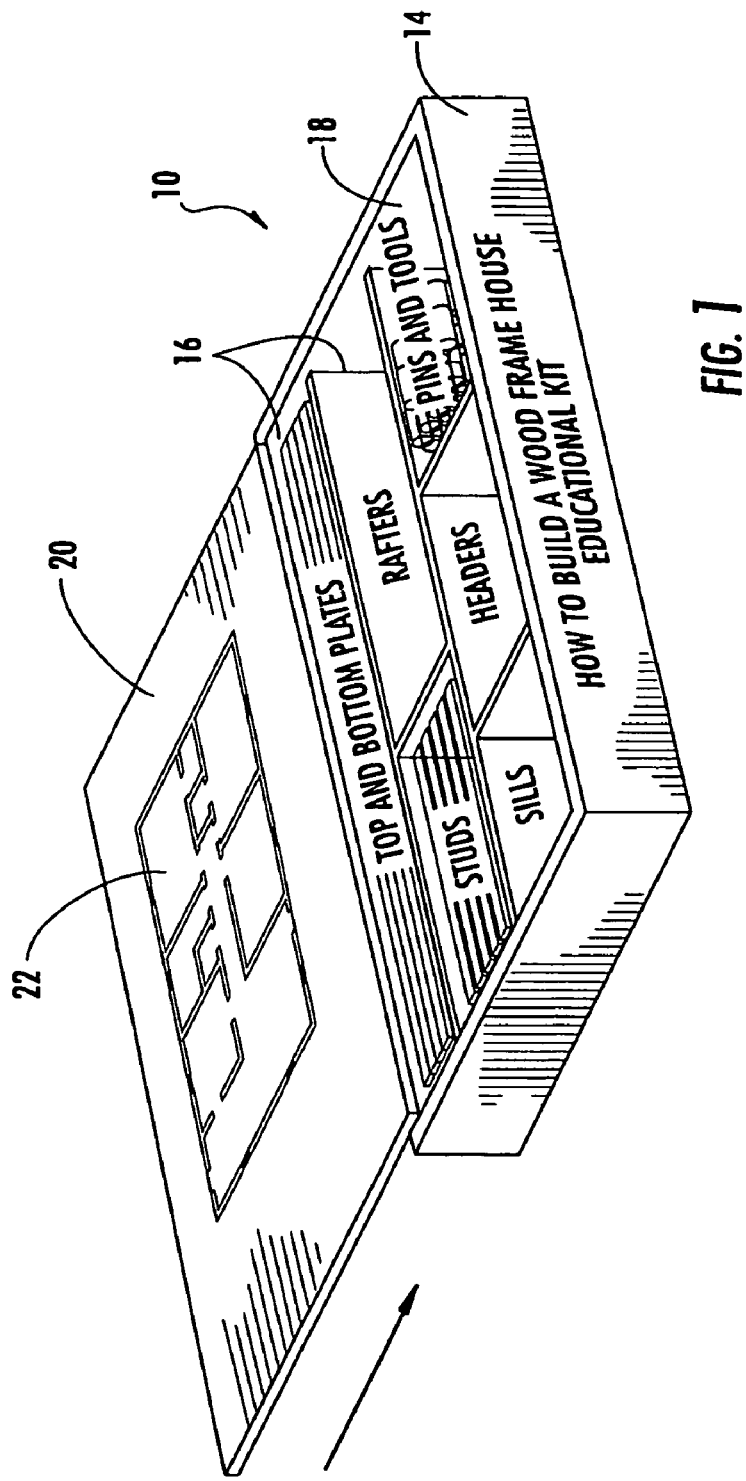
FIG. 1 is a perspective view the educational kit of the present invention.

Now referring to the drawings, the educational kit of the present invention is shown and generally illustrated at 10 in FIGS. 1–4. Further, the overall wood framed structure is generally indicated at 12. The preferred embodiment of the present invention is generally an educational kit 10 that includes all of the required framing members, layout plans, construction details and instructions to build a true to life scale model of a wood framed structure 12. The kit 10 includes a plurality of precut framing members to construct a predetermined scale model structure 12. The kit 10 of the present invention is specifically configured to teach the methods and materials necessary to construct a conventionally framed residential dwelling 12. While the figures illustrate the kit 10 as providing the necessary structural members to construct a structure 12 in the predetermined form of a single story ranch structure, it can be appreciated that the present invention is directed to an educational kit 10 that is suited to teaching the techniques necessary to build any conventionally framed wood structure and may take the form of a ranch style house as shown or any other style home. In this regard, the kit 10 may be configured to include framing members that are precut and configured to be assembled into Colonial, Raised-ranch, Cape Cod, Saltbox, Contemporary or Victorian and still fall within the scope of the present invention. Further, while the educational features of the present invention are emphasized, it is clear that a person could build the scale model structure 12 of the present invention for recreation and that such an activity would also be anticipated within the scope of the present invention.

Turning now to the figures, FIG. 1 shows the educational kit 10 of the present invention. The kit 10 is packaged in a suitable container 14 to hold all of the various framing members necessary to construct the wood framed model house 12. The container 14 is provided with several compartments 16 to receive and contain each of the different types of framing members while maintaining them is a separated and organized manner. Further, the container 14 includes a compartment 18 to hold pin type fasteners as will be further described below and a compartment to hold various tools and adhesives for use in constructing the scale model 12. The lid 20 of the container 14 is configured and arranged to be removed from the container 14 for use as a base upon which to build the model house 12. As can be seen, the lid 20 has a detailed floor plan layout 22 of the structural model 12 to be built imprinted thereon. Accordingly, the lid 22 serves both as the plan 22 for the structure 12 as well as the first floor structure and a convenient means for handling the model 12 as it is being built.

Figure 2:
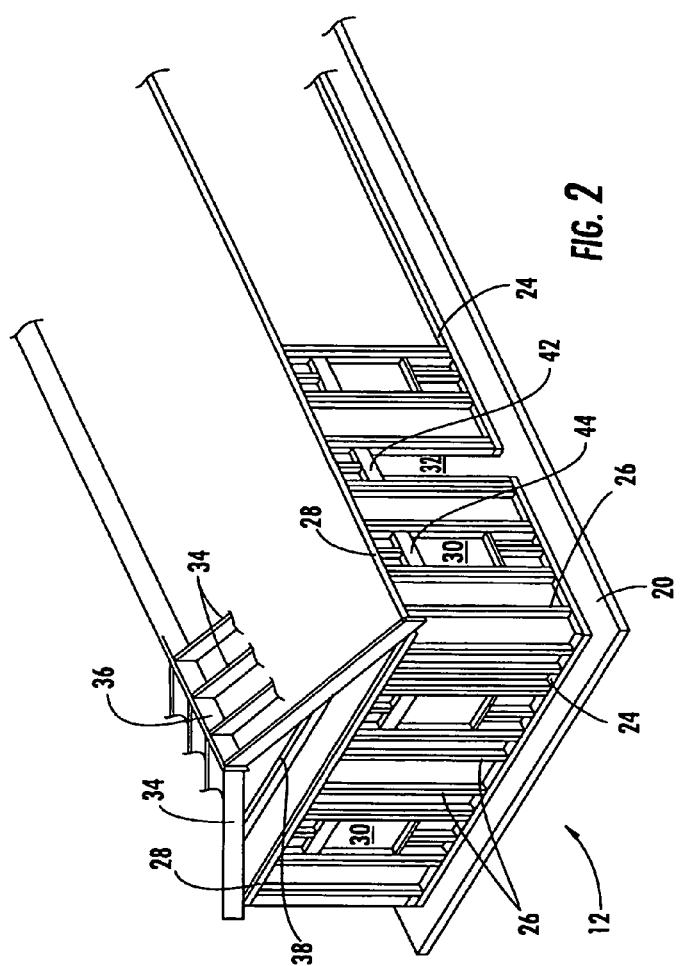
FIG. 2 is a perspective view of a scale model of a conventionally framed wood structure assembled utilizing the educational kit of the present invention.

Turning now to FIG. 2, a fully constructed representation of the scale model wood framed house 12 is shown. In this view, it can be seen that the model 12 once fully assembled includes a realistic representation of the actual framing members traditionally used in conventional type wood framing. In assembling the model 12, the user installs each and every framing member in the same manner as they would be installed in a real structure. First, the user installs the sill plates 24 onto the plan layout 22 provided and imprinted on the cover 20 of the educational kit 10. Next, each of the stud framing members 26 is installed onto the sill plates 24. While traditionally, the stud members 26 would be nailed in place by nailing through the bottom of the sill 24 and into the stud 26, the scale of this particular model would not permit such techniques. Accordingly, as an alternative to nails, small pin brads are provided to serve as nails. To install the pin brads, a user installs them into the correct locations on the sill plate 24 by pressing them into the sill plate 24. When the pin is installed, a portion of the pin is left exposed. The user then presses a stud 26 onto the exposed portion of the pin. In this manner, the pin serves as a representational nail retaining the stud 26 in its installed position on the sill plate 24. Similarly, when the top plate 28 is installed, the user places the top plate 28 onto the top ends of the studs 26 and then presses the fasteners through the top plate 28 and into the top end of the studs 26. This is the fastening method utilized to connect all of the structural framing members in the entire structure in lieu of nailing as is the case in real framing construction.

The scale model 12 provides precut representations of all of the traditional dimensional framing lumber components utilized in wood frame construction. The kit includes sill plates 24 which are installed onto the floor base 20 in accordance with the layout 22 printed thereon. Next, the wall studs 26 are installed onto the sill plate 24. A top plate 28 is then installed onto the tops of the studs 26. At locations where openings will be provided in the walls, such as at window 30 and door 32 openings, conventional framing details are utilized as will be discussed in further detail below. Upon completion of the wall structures, if the structure 12 is a single story structure as is shown in the figures, the roof framing is installed. In the alternative, if the structure 12 has two stories, a second floor and the necessary additional walls are installed before the roof structure is installed. The roof rafters 34 are shown springing from the top plate 28 and are supported centrally at the ridge line of the roof by a ridge beam 36. Collar ties 38 are then installed between opposing rafters 34 to prevent them from spreading apart and causing the roof to sag.

Figure 3:
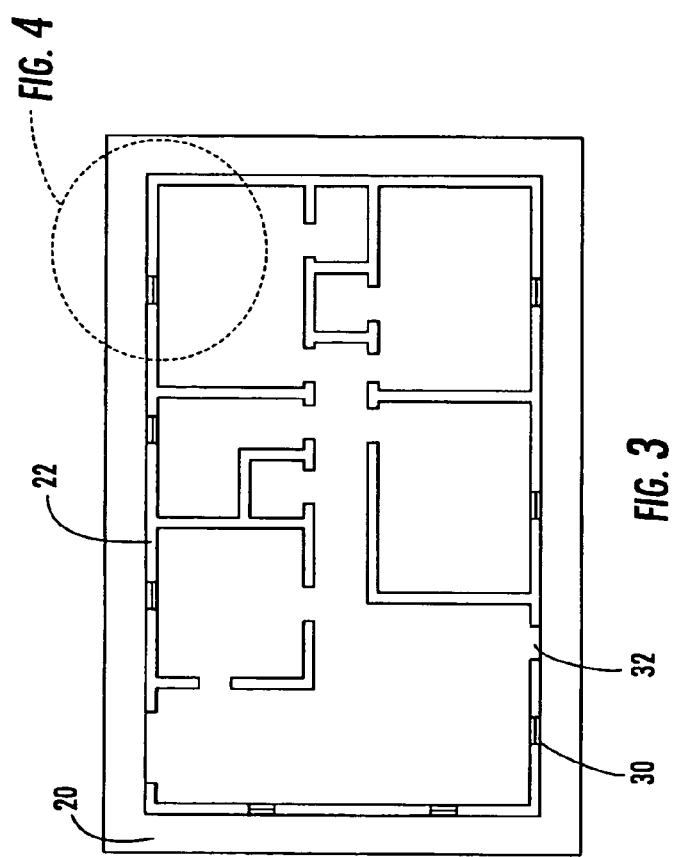
FIG. 3 is a plan view of the floor platform illustrating the wall layout.
Figure 4:
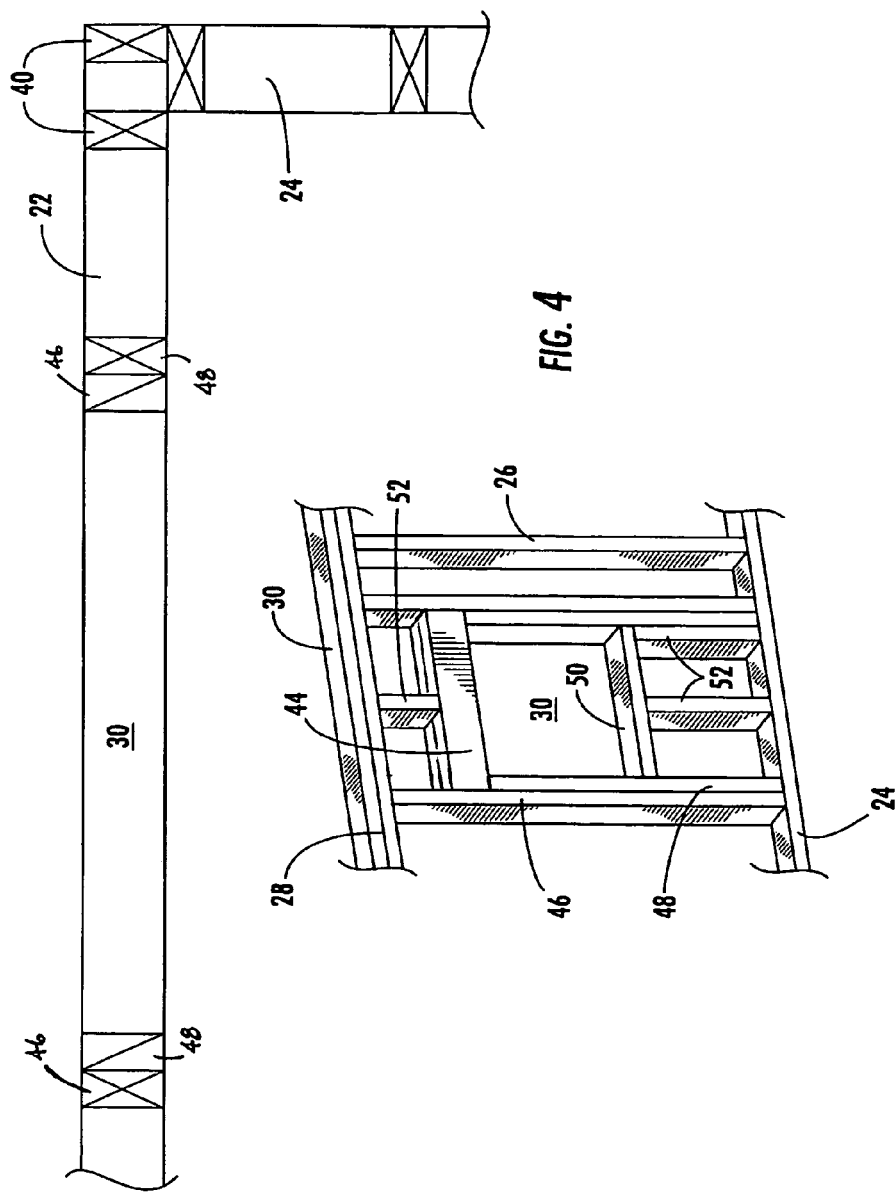
FIG. 4 is a detail view of the floor plan and framing details.

Turning now to FIG. 3 a sample floor plan layout 22 as would be used to form a typical single story ranch is shown. The floor plan layout 22 is printed onto the box lid 20, which also serves as the base upon which the model 12 is built. The floor plan 22 is illustrated as a typical construction plan would be illustrated and includes markings 40 that represent the various types of framing members that are to be installed into each of the necessary locations. For example, a detail view of the plan as is shown in FIG. 4 includes markings 40 that indicate where full height stud 26 members would be installed as well as indications where wall openings such as windows 30 and doors 32 are provided. To construct the particular areas where the framing is more complex, the builder is referred to illustrative details much as a traditional construction plan would. The details show the proper placement of the door headers 42 or window headers 44 including the necessary king post 46 and queen post 48 at each side of the opening, the sill 50 placement and the proper framing details for incorporating cripple studs 52. While a window 30 is shown in this particular detail, a door 32 would be framed in the same manner, although the door opening 32 would not include the sill 50 or bottom cripple studs 52 that are shown in conjunction with the window 30 framing.

The kit 10 also includes detailed narrative instructions that describe the proper process in framing a conventional wood framed structure 12. Further, the instructions include recommended framing methods and techniques as well as common and helpful construction tips. The instructions also provide definitions and descriptions of each of the framing members as well as their purpose and the proper manner for installation.

The kit 10 of the present invention serves as a useful tool for educating a user as to the proper terminology for all of the components utilized in constructing a wood framed structure 12. Further, the kit 10 serves to illustrate the proper techniques and methods in constructing such a structure. Finally, the present invention also provides a kit 10 that is useful for entertainment purposes should a user wish to construct the structural model 12 simply to satisfy a curiosity regarding the manner in which a conventionally framed wood structure is built.

It can therefore be seen that the present invention provides a novel education approach for teaching a user the proper means and methods for constructing a conventionally framed wood structure. Further, the present invention provides a hands on device that teaches a user the necessary terminology and relationship between the framing components utilized to construct a wood framed structure. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

The invention claimed is:

1. An instructional kit for building a scale model wood frame structure to teach proper wood frame construction means and methods, the kit comprising:

a base member including a layout thereon, said layout representing the wood frame structure to be built;

a plurality of precut scale framing members, said framing members being scale representations of actual framing members utilized in conventional residential wood frame construction, said framing members configured to be assembled on said base member into said predetermined wood frame structure, said framing members including a plurality of sill plates, a plurality of stud members, a plurality of wall top plates, at least one window header, at least one window sill, at least one door header, a plurality of roof rafters and at least one ridge beam;

a plurality of double ended brad pin fasteners to fasten said plurality of precut scale framing members to one another, each of said brad pin fasteners having a first end and a second end opposite said first end, both of said first and second ends capable of engaging a framing member;

a tool for installing said brad pin fasteners;

a container having several compartments therein, said compartments configured for storing said plurality of precut scale framing members, wherein said base member serves as a lid for said container; and instructions regarding the manner in which said plurality of precut scale framing members are installed onto said base member to form said predetermined wood frame structure, wherein assembly of said plurality of precut framing members utilizing said brad pin fasteners simulates actual techniques utilized in wood frame construction, thereby educating a user regarding said techniques.

2. The instructional kit of claim 1, wherein said tool is configured to install said first end of said brad pin fasteners into a first framing member wherein said second end of said brad pin fastener remains exposed after said tool is removed.

3. The instructional kit of claim 1, wherein said scale model wood frame structure is configured to represent a residential structure having a style selected from the group consisting of: Ranch, Colonial, Raised-ranch, Cape Cod, Saltbox, Contemporary and Victorian.

4. The instructional kit of claim 1, wherein said layout on said base member includes markings indicating the proper positioning of at least a portion of said plurality of framing members.

5. A method of educating a person regarding the means and methods of constructing a wood frame structure, the method comprising:

providing an instructional kit comprising:
- a base member including a layout thereon, said layout representing the wood frame structure to be built;
- a plurality of precut scale framing members, said framing members being scale representations of actual framing members utilized in conventional residential wood frame construction, said framing members configured to be assembled on said base member into said predetermined wood frame structure, said framing members including a plurality of sill plates, a plurality of stud members, a plurality of wall top plates, at least one window header, at least one window sill, at least one door header, a plurality of roof rafters and at least one ridge beam;
- a plurality of brad pin fasteners, each of said brad pin fasteners having a first end and a second end opposite said first end, both of said first and second ends capable of fastening said plurality of precut scale framing members to one another; and
- a container having several compartments therein, said compartments configured for storing said plurality of precut scale framing members and said fasteners, wherein said base member serves as a lid for said container; and
- providing means for instructing the person regarding the manner in which said plurality of precut scale framing members are installed onto said base member, wherein said person utilizes said instructional kit and said means for instructing to build said predetermined wood frame structure, wherein assembly of said plurality of precut framing members utilizing said brad pin fasteners simulates actual techniques utilized in wood frame construction, thereby educating a user regarding said techniques.

6. The method of claim 5, wherein said scale model wood frame structure is configured to represent a residential structure having a style selected from the group consisting of: Ranch, Colonial, Raised-ranch, Cape Cod, Saltbox, Contemporary and Victorian.

7. The method of claim 5, wherein said layout on said base member includes markings indicating the proper positioning of at least a portion of said plurality of framing members.

\* \* \* \* \*